US012610145B2

(12) United States Patent
Maruyama

(10) Patent No.: US 12,610,145 B2
(45) Date of Patent: Apr. 21, 2026

(54) IMAGING CONTROL APPARATUS, IMAGING CONTROL METHOD, AND STORAGE MEDIUM

(71) Applicant: CANON KABUSHIKI KAISHA, Tokyo (JP)

(72) Inventor: Naoki Maruyama, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 182 days.

(21) Appl. No.: 18/504,789

(22) Filed: Nov. 8, 2023

(65) Prior Publication Data

US 2024/0155238 A1 May 9, 2024

(30) Foreign Application Priority Data

Nov. 8, 2022 (JP) .................................. 2022-178645

(51) Int. Cl.
| | |
|---|---|
| *H04N 23/69* | (2023.01) |
| *G02B 7/28* | (2021.01) |
| *H04N 23/62* | (2023.01) |
| *H04N 23/67* | (2023.01) |

(52) U.S. Cl.
CPC ............. *H04N 23/69* (2023.01); *G02B 7/282* (2013.01); *H04N 23/62* (2023.01); *H04N 23/67* (2023.01); *H04N 23/675* (2023.01)

(58) Field of Classification Search
None
See application file for complete search history.

(56) References Cited

U.S. PATENT DOCUMENTS

| | | | |
|---|---|---|---|
| 5,457,370 A | 10/1995 | Edwards | |
| 2006/0244834 A1 | 11/2006 | Cazier | |
| 2010/0066864 A1* | 3/2010 | Abe ..................... | H04N 5/2628 |
| | | | 348/E5.055 |

(Continued)

FOREIGN PATENT DOCUMENTS

| | | |
|---|---|---|
| EP | 0606563 A | 7/1994 |
| JP | 2006349744 A | 12/2006 |

OTHER PUBLICATIONS

Canon "Remote Camera Control Application User Manual", Nov. 11, 2021 pp. 1-38.

*Primary Examiner* — Twyler L Haskins
*Assistant Examiner* — Wesley J Chiu
(74) *Attorney, Agent, or Firm* — Canon U.S.A., Inc., IP Division

(57) ABSTRACT

An apparatus includes at least one processor, and a memory coupled to the at least one processor, the memory storing instructions that, when executed by the at least one processor, cause the at least one processor to acquire a first imaging condition and a second imaging condition wherein an imaging parameter is set for each of the first and second imaging conditions, the imaging parameter includes a zoom magnification and a focus position, control a first drive unit to perform a zooming operation from the zoom magnification of the first imaging condition to the zoom magnification of the second imaging condition, and control a second drive unit during the zooming operation based on correspondence information indicating a focus lens position with respect to a zoom lens position, to change from the focus position of the first imaging condition to the focus position of the second imaging condition in one direction.

14 Claims, 17 Drawing Sheets

(56)                    References Cited

U.S. PATENT DOCUMENTS

2010/0178045  A1*    7/2010  Hongu ................... G02B 7/282
                                                          396/80
2018/0270412  A1*    9/2018  Kanda ................. H04N 23/632
2019/0394388  A1*   12/2019  Takanashi ............. H04N 23/63
2020/0132963  A1     4/2020  Honjo
2021/0109313  A1*    4/2021  Homma ................... G02B 7/10
2023/0209175  A1*    6/2023  Saito .................... H04N 23/631
                                                        348/333.02
2024/0137642  A1*    4/2024  Yamasaki ............ H04N 23/815
2025/0056108  A1*    2/2025  Ohlgren ................ H04N 23/69

* cited by examiner

FIG.7

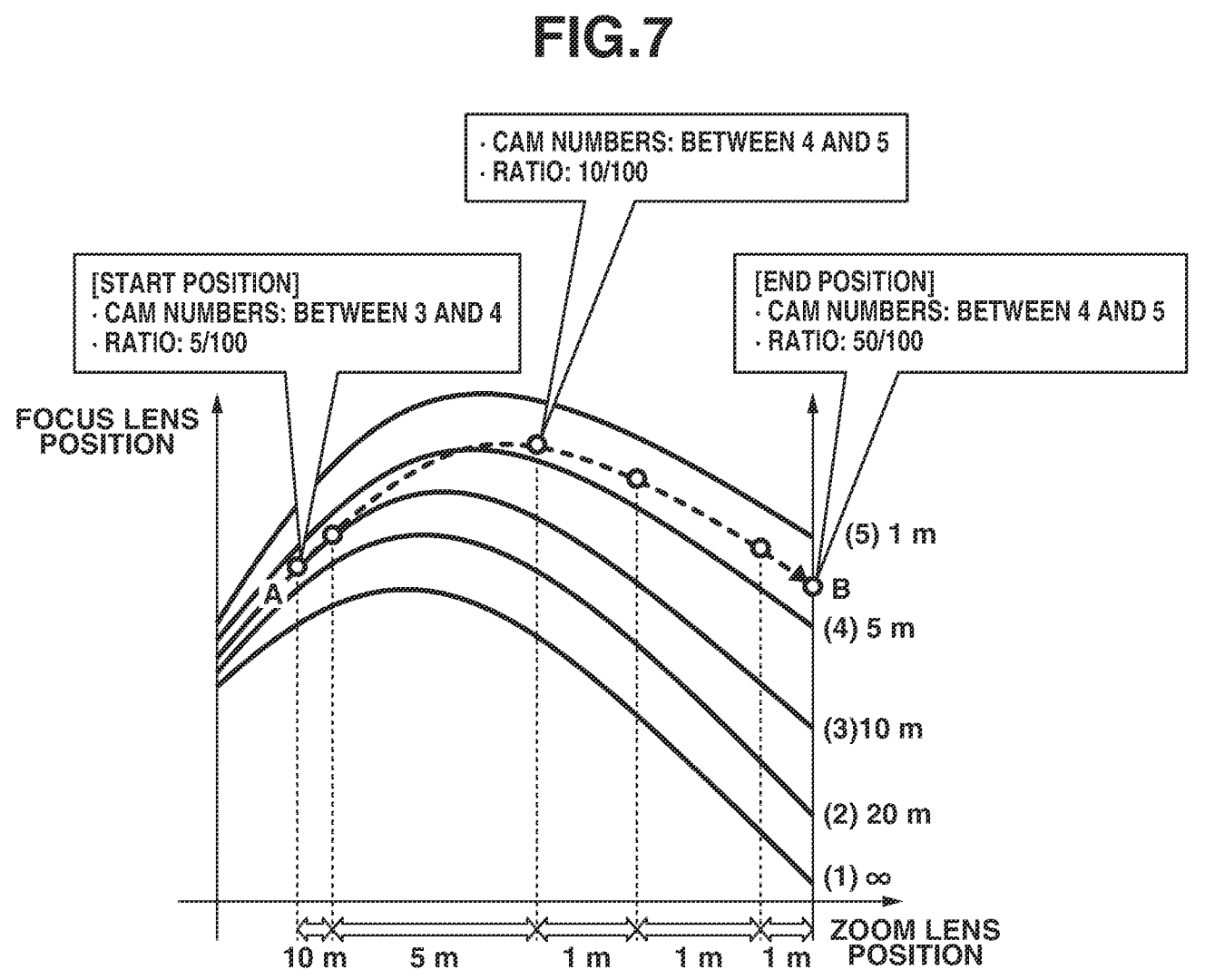

[END POSITION]
· CAM NUMBERS: BETWEEN 4 AND 5
· RATIO: 50/100

· CAM NUMBERS: BETWEEN 4 AND 5
· RATIO: 10/100

[START POSITION]
· CAM NUMBERS: BETWEEN 3 AND 4
· RATIO: 5/100

FOCUS LENS
POSITION

ZOOM LENS
POSITION (5) 1 m (4) 5 m (3)10 m (2) 20 m (1) ∞

Figure 10:
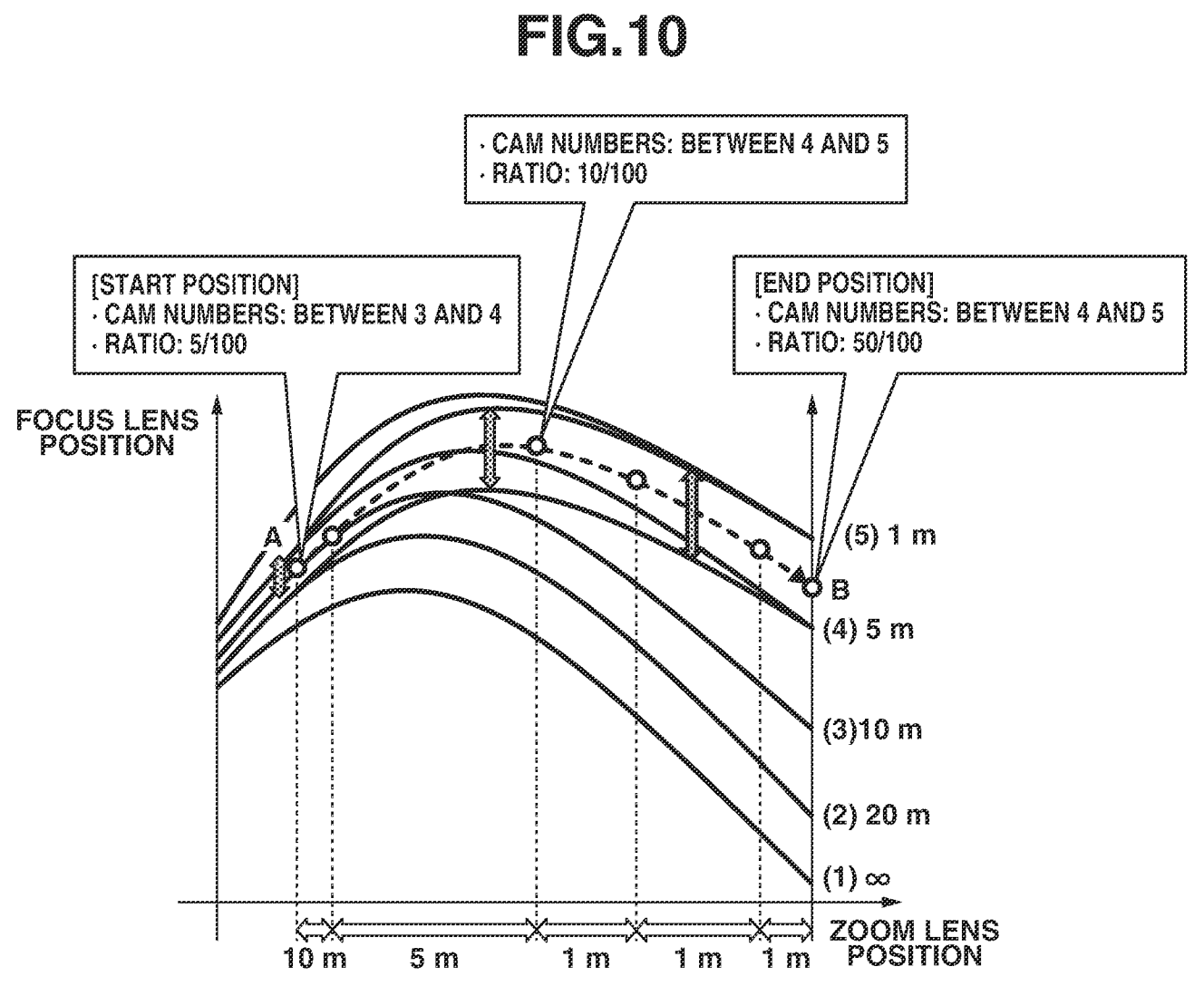

[END POSITION]
· CAM NUMBERS: BETWEEN 4 AND 5
· RATIO: 50/100

CAM NUMBERS: BETWEEN 4 AND 5
· RATIO: 10/100

[START POSITION]
· CAM NUMBERS: BETWEEN 3 AND 4
· RATIO: 5/100

FOCUS LENS
POSITION (5) 1 m
(4) 5 m
(3)10 m
(2) 20 m
(1) ∞

ZOOM LENS
POSITION 10 m  5 m      1 m      1 m      1 m

IMAGING CONTROL APPARATUS, IMAGING CONTROL METHOD, AND STORAGE MEDIUM

BACKGROUND OF THE INVENTION

Field of the Invention

The present invention relates to an imaging control apparatus, an imaging control method, and a storage medium.

Description of the Related Art

In recent years, remote cameras that are capable of remotely capturing images have been widely used.

The remote cameras are installed at freely selected places, and imaging positions are fixed. Thus, the remote cameras can perform the same operation repeatedly. Some of the remote cameras include a "trace function" which involves registering the imaging conditions of the camera in advance, and then performing imaging. The trace function is, for example, a function of setting the time it takes to drive a lens from a zoom magnification to another zoom magnification in seconds and performing imaging based on the set lens drive time. The trace function enables a plurality of imaging functions to be simultaneously performed, such as zooming, focusing, panning (e.g., to change an imaging direction), and tilting. Determining imaging point settings in detail enables imaging that reflects the intentions of a user who captures images, but setting the imaging point settings for a plurality of imaging conditions in advance and in detail is difficult to achieve.

Japanese Patent Application Laid-Open No. 2006-349744 discusses an imaging apparatus with an additional function of placing limits on a movable range of a lens for auto-focusing. In this technique, limits are placed on a movable range of a focus lens to maintain an imaging target subject distance after setting the imaging target subject distance.

The technique discussed in Japanese Patent Application Laid-Open No. 2006-349744 makes it possible to perform imaging with the focus maintained on an imaging target even in a case where the trace function is used. This reduces the number of processes.

SUMMARY OF THE INVENTION

According to an aspect of the present invention, an apparatus includes a first drive unit configured to drive a zoom lens and change an angle of view, a second drive unit configured to drive a focus lens and change a focus position, at least one processor, and a memory coupled to the at least one processor, the memory storing instructions that, when executed by the at least one processor, cause the at least one processor to acquire a first imaging condition and a second imaging condition wherein an imaging parameter is set for each of the first and second imaging conditions, the imaging parameter includes a zoom magnification and a focus position, control the first drive unit to perform a zooming operation from the zoom magnification of the first imaging condition to the zoom magnification of the second imaging condition, and control the second drive unit during the zooming operation based on correspondence information indicating a focus lens position with respect to a zoom lens position, to change from the focus position of the first imaging condition to the focus position of the second imaging condition in one direction.

Further features of the present invention will become apparent from the following description of exemplary embodiments with reference to the attached drawings.

BRIEF DESCRIPTION OF THE DRAWINGS

FIG. 7 is a diagram illustrating an example of a focus position calculated for each zoom position.

FIG. 10 illustrates an example of a setting of a focus movable range for each zoom position.

DESCRIPTION OF THE EMBODIMENTS

Various exemplary embodiments of the present invention will be described in detail below with reference to the accompanying drawings.

The exemplary embodiments described below are merely examples of implementation of the present invention and are to be modified or changed as suitable for a configuration of an apparatus to which the present invention is applied or various conditions, and the present invention is not limited to the exemplary embodiments described below.

A first exemplary embodiment of the present invention will be described below.

Figure 1:
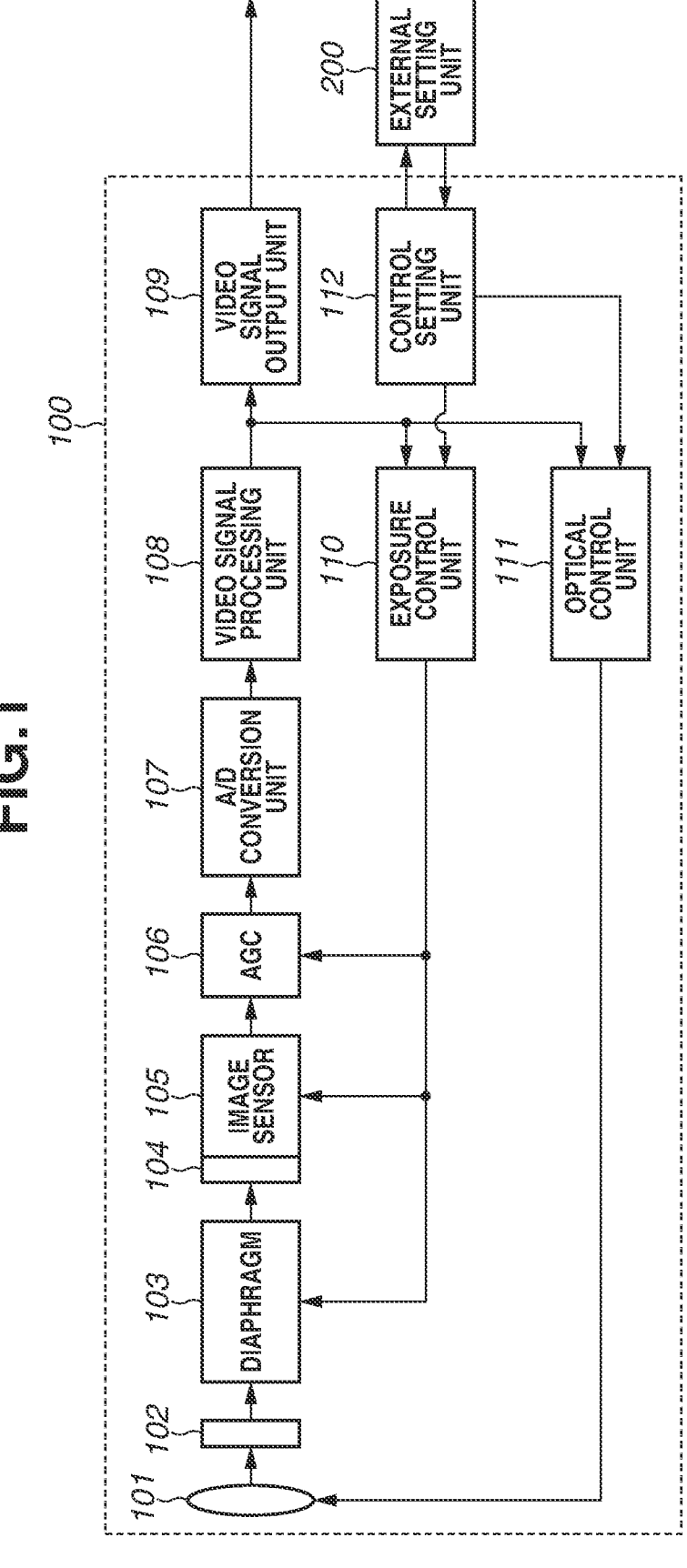
FIG. 1 is a diagram illustrating an example of a configuration of an imaging apparatus according to a first exemplary embodiment.

FIG. 1 is a diagram illustrating an example of a configuration of an imaging apparatus 100 including an imaging control apparatus according to the present exemplary embodiment.

The imaging apparatus 100 includes a lens group 101, an optical filter 102, a diaphragm 103, color filters 104, an image sensor 105, an automatic gain controller (AGC) 106, an analog/digital (A/D) conversion unit 107, and a video signal processing unit 108. The imaging apparatus 100 further includes a video signal output unit 109, an exposure control unit 110, an optical control unit 111, and a control setting unit 112.

The imaging apparatus 100 is connected to an external setting unit 200 and a monitor (not illustrated) via a network. The monitor displays captured images.

The lens group 101 is an optical system that focuses incident light from a subject onto the image sensor 105. The lens group 101 includes a focus lens and a zoom lens. The focus lens focuses on a subject. The zoom lens adjusts an angle of view. Light having traveled through the lens group 101 travels through the optical filter 102, and the amount of the light is adjusted by using the diaphragm 103. The optical filter 102 can be, for example, an infrared-cut filter (IRCF).

The lens group 101 includes a motor mechanism (first drive unit) for moving a zoom position of the zoom lens and another motor mechanism (second drive unit) for moving a focus position of the focus lens.

The diaphragm 103 adjusts the amount of light to be incident on the image sensor 105. Video information having undergone the adjustment of the amount of light travels through the color filters 104 arranged in a predetermined order for each pixel of a light-receiving surface of the image sensor 105 and is received by the image sensor 105.

The image sensor 105 outputs imaging target captured image information as an analog signal. The image sensor 105 may be, for example, a charge-coupled device (CCD) sensor or a complementary metal oxide semiconductor (CMOS) sensor. The AGC 106 performs gain control on an image formed on the image sensor 105 and adjusts luminance of the video signal. The A/D conversion unit 107 converts the analog imaging signal of the image having undergone the luminance adjustment with the AGC 106 into a digital signal.

The video signal processing unit 108 performs predetermined processing on the digital imaging signal from the A/D conversion unit 107 and outputs a luminance signal and a color signal for each pixel. The video signal processing unit 108 generates an image for output and generates parameters for performing camera controls. Examples of the parameters for performing the camera controls include parameters for use in aperture control, auto-focus (AF) evaluation values, which are frequency component values, for performing focus adjustment, and parameters for use in white balance control for color adjustment.

The video signal output unit 109 outputs the video signal generated by the video signal processing unit 108 to an external destination.

The exposure control unit 110 calculates luminance information about luminance in an imaging screen based on luminance information output from the video signal processing unit 108 and controls the diaphragm 103 and the AGC 106 to adjust the captured image to desired brightness. The shutter speed may be adjusted to adjust an accumulation time of the image sensor 105, in order to adjust the brightness adjustment.

The optical control unit 111 controls the lens group 101. More specifically, the optical control unit 111 can change the angle of view by driving the zoom lens. The optical control unit 111 can change the focus position by driving the focus lens. The optical control unit 111 performs focus adjustment (focusing operation) by controlling the lens group 101 so as to maximize an AF evaluation value. A high-frequency component is extracted from the video signal generated by the video signal processing unit 108, and a value of the high-frequency component is used as focus information (AF evaluation value).

In practice, the control setting unit 112 performs control commands transmitted from the external setting unit 200 and issued to a camera. The control setting unit 112 also sets exposure control settings and lens control settings. The control setting unit 112 also performs correction processing associated with operations set by the external setting unit 200. The control setting unit 112 sets a focusing area on which a focusing operation is to be performed, and sets a clipping area described below based on a user instruction.

The external setting unit 200 is connected to the imaging apparatus 100 via the network and operates the imaging apparatus 100. For example, the external setting unit 200 performs so-called general camera operations, such as focus adjustment, brightness designation, and zoom magnification designation. The external setting unit 200 is formable with, for example, a personal computer (PC).

The external setting unit 200 may be included in the imaging apparatus 100.

Figure 2:
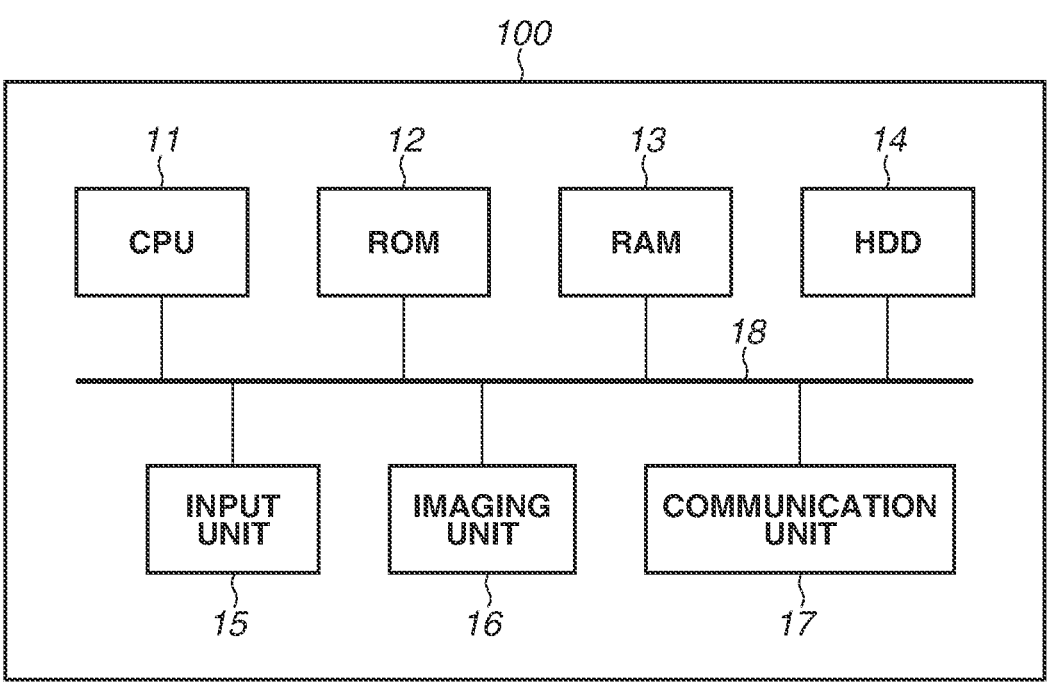
FIG. 2 is a diagram illustrating an example of a hardware configuration of the imaging apparatus.

FIG. 2 is a diagram illustrating an example of a hardware configuration of the imaging apparatus 100.

The imaging apparatus 100 includes a central processing unit (CPU) 11, a read-only memory (ROM) 12, a random access memory (RAM) 13, a hard disk drive (HDD) 14, an input unit 15, an imaging unit 16, and a communication unit 17. The imaging apparatus 100 may further include components other than those described above.

The CPU 11 comprehensively controls operations of the imaging apparatus 100. The ROM 12 includes a storage area for storing programs and data for the CPU 11 to execute processing.

The programs can be stored in the HDD 14 or a removable storage medium (not illustrated). The RAM 13 functions as a main memory of the CPU 11 and a work area. The CPU 11 loads a program for executing processing from the ROM 12 to the RAM 13 and executes the program to realize various functional operations.

The HDD 14 is used not only as a permanent storage area for storing an operating system (OS), various programs, and various data but also as a temporary storage area for storing various data.

Another auxiliary storage apparatus, such as a solid state drive (SSD), can be used in place of the HDD 14.

The input unit 15 includes a power button and a set button, and an operator of the imaging apparatus 100 can issue instructions to the imaging apparatus 100 via the input unit 15.

The imaging unit 16 images a subject and generates a captured image. The imaging unit 16 can include the color filters 104, the image sensor 105, the AGC 106, the A/D conversion unit 107, and the video signal processing unit 108 illustrated in FIG. 1.

The communication unit 17 transmits and receives data to and from external apparatuses, such as the external setting unit 200, via the network.

The functions of the imaging apparatus 100 are partially or entirely realized by the CPU 11 executing programs stored in the ROM 12 or the HDD 14. At least part of the functions of the imaging apparatus 100 may be operated as dedicated hardware. In this case, the dedicated hardware operates under control of the CPU 11.

Focusing operations in a trace function according to the present exemplary embodiment will be described below.

Figure 3:
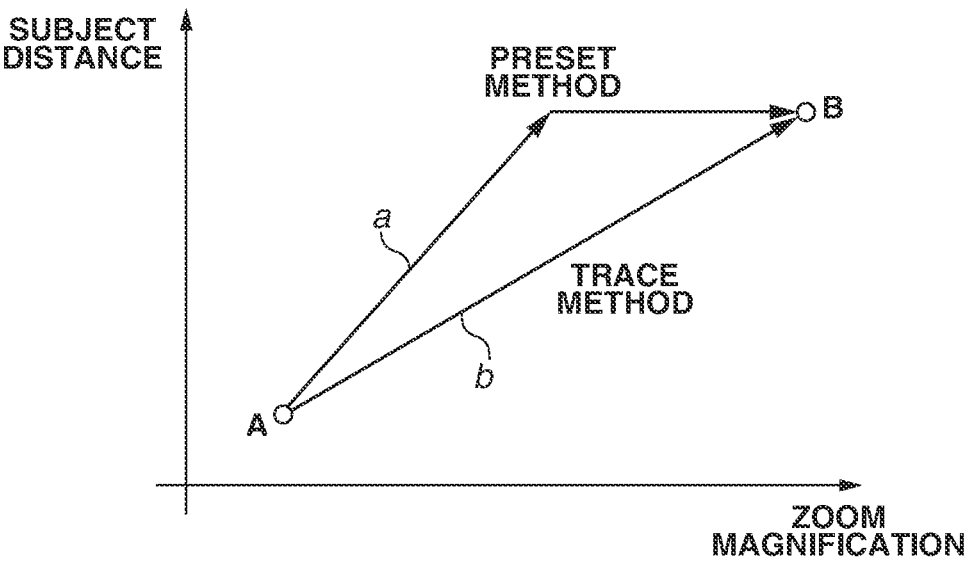
FIG. 3 is a diagram illustrating a trace function.

The trace function will be described below with reference to FIG. 3. In FIG. 3, a horizontal axis represents zoom magnification, and a vertical axis represents subject distance (focus position) at which focus is achieved.

In FIG. 3, two drive methods, a preset method and a trace method, are illustrated as an example. A case where an imaging operation in which a point A with adjusted focus and adjusted zoom and a point B are connected will be described below is performed.

In the case of the preset method, the points A and B, which are preset positions, are registered. At this time, a zoom magnification and a focus position are registered as imaging conditions for each of the points A and B. The zoom lens is moved to change the zoom magnification from the zoom magnification at the point A to the zoom magnification at the point B, and the focus lens is moved to change the focus position from the focus position at the point A to the focus position at the point B.

With the preset method, movements are unrestricted by another function, so that each function is performed in the shortest time, but meanwhile, as indicated by the arrow a in FIG. 3, there are cases where, for example, only the focus reaches a target position first and the zoom becomes properly adjusted afterward.

In contrast to this, the trace method is similar to the preset method in that the zoom and the focus are moved from the point A to the point B, but is different from the preset method in that, as indicated by the arrow b in FIG. 3, changes are performable while amounts of drive are adjusted so that the operations end simultaneously. In this case, the imaging conditions at imaging points between the points A and B are registered in detail so that imaging that reflects the intent of a user capturing images is realized.

In the case of the trace method, however, operations of setting the plurality of imaging conditions between the points A and B are to be made in advance and in detail. In particular, the focusing to adjust the focus involves detailed operations because subject distances at which focus is achieved are defined by a cam curve representing a positional relationship between the zoom lens and the focus lens.

Figure 4:
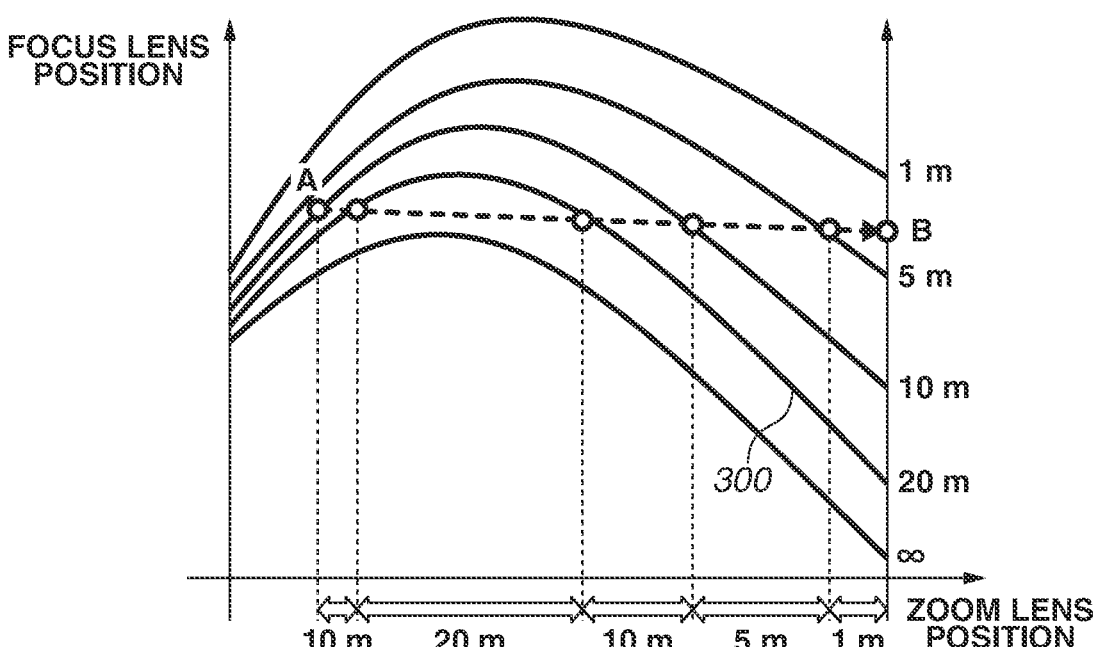
FIG. 4 is a diagram illustrating an example of cam curves and a focus movement.

FIG. 4 is a diagram illustrating an example of cam curves of the imaging apparatus 100.

In FIG. 4, the horizontal axis represents position (zoom lens position) on an optical axis of the zoom lens, and the vertical axis represents position (focus lens position) on an optical axis of the focus lens. An upper side of the vertical axis corresponds to a close side, whereas a lower side of the vertical axis corresponds to an infinity side.

A cam curve is a curve representing a correspondence relationship between positions of the zoom lens and the focus lens where an in-focus position is achieved at a subject distance, and is also referred to as "tracking curve". In FIG. 4, solid lines represent lens position relationships for focusing at subject distances of 1 m, 5 m, 10 m, 20 m, and infinite (∞).

For example, in a case where the zoom is to be moved from wide to telephoto while a subject at 20 m away is being focused on, the zoom lens and the focus lens are moved along a cam curve 300 corresponding to 20 m. This makes it possible to maintain an in-focus state while the zoom magnification is being changed.

As described above, even if the subject distances are the same, it is common for the focus lens position to vary depending on the zoom position.

The zoom lens commonly possesses the above-described optical characteristics.

Thus, performing simple control of the focus lens position alone results in unnatural imaging.

For example, in a case where the subject distance is moved from the point A to the point B at which the focus lens position is the same as the focus lens position at the point A in FIG. 4, the zoom lens position is to be changed, but the focus lens position is not to be moved because the zoom magnifications of the points A and B are different.

However, as indicated by a broken line in FIG. 4, moving the zoom lens without moving the focus lens results in a consequence that the subject distance at which focus is achieved moves from the cam curve corresponding to 10 m to the cam curves corresponding to 20 m, 10 m, 5 m, and 1 m sequentially in this order as illustrated in FIG. 4. Thus, in a case where a user capturing images intends to move the subject distance where focus is achieved from 10 m to 1 m gradually in one direction, a movement in which a focus is achieved on a subject that is not intended by the user may be performed during the gradual movement of the subject distance.

Figure 5:
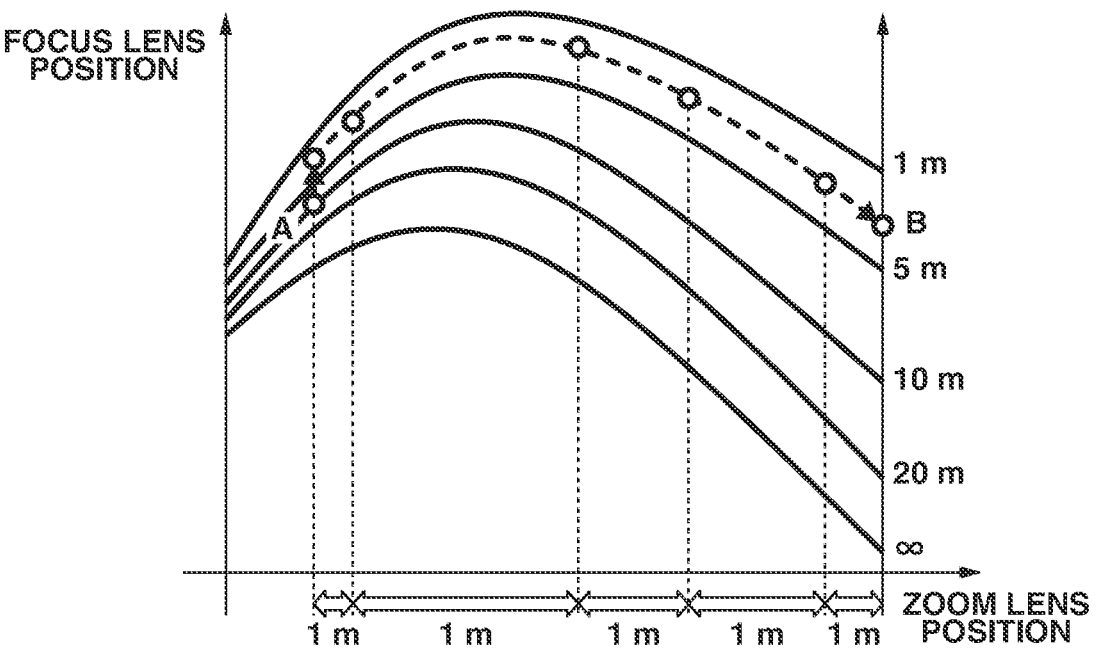
FIG. 5 is a diagram illustrating an example of cam curves and a focus movement.

In a case where the zoom is moved while auto-focus operation of automatically focusing on a subject is being performed, a pattern in which a movement while focusing on an imaging target at the point B from the beginning is exhibited as illustrated in FIG. 5.

In such a case, the lens operations along a cam curve corresponding to a target subject distance is achieved, so that a state where a target subject is in focus is constantly maintained. However, this results in a consequence that the subject at a distance of 3 m at the point B suddenly comes into focus as soon as the zoom starts moving from a state where the subject at a distance of 10 m at the point A is in focus.

Thus, imaging that is intended by the user capturing images is not realized in a case where the user intends to gradually move the subject distance at which focus is achieved from 10 m to 1 m in one direction.

As described above, the imaging methods illustrated in FIGS. 4 and 5 cannot realize a focusing operation of gradual-focusing.

Figure 6:
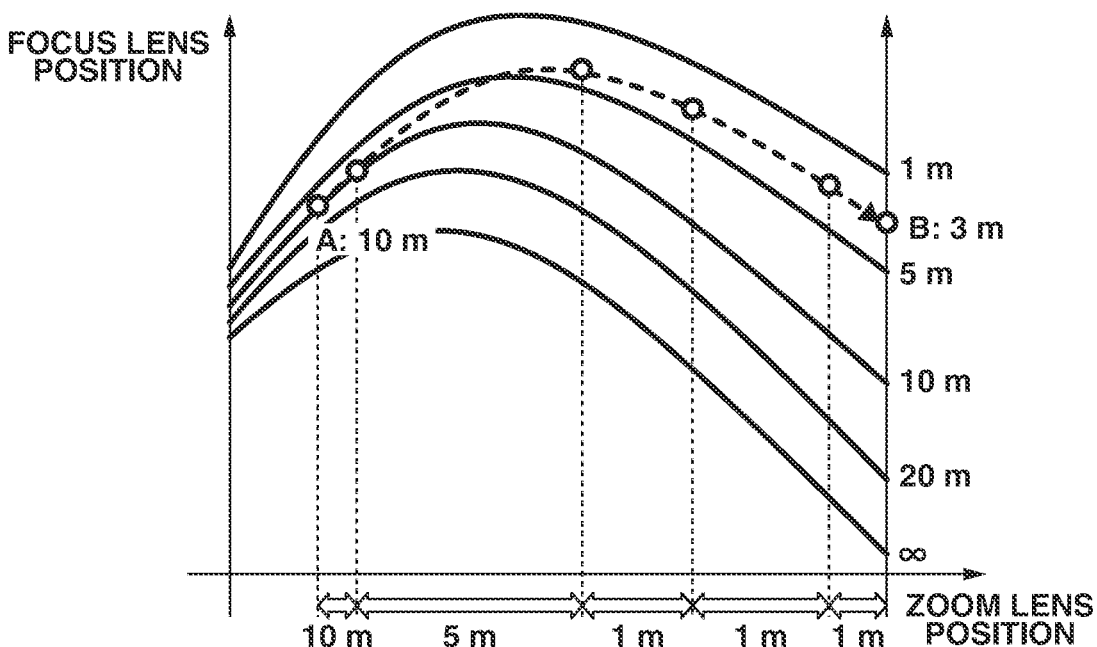
FIG. 6 is a diagram illustrating an example of cam curves and a focus movement according to the first exemplary embodiment.

Thus, according to the present exemplary embodiment, a cam curve for gradually achieving the focus from the subject at the point A to the subject at the point B is calculated as indicated by a broken line in FIG. 6, and the lens operations are performed along the calculated cam curve. The cam curve is correspondence information indicating the focus lens position with respect to the zoom lens position for changing from the focus position at the point A to the focus position at the point B in one direction during zooming from the zoom magnification at the point A to the zoom magnification at the point B. Hereinafter, the cam curve indicated by the broken line in FIG. 6 will be referred to as "trace cam curve". In other words, the correspondence information refers to the trace cam curve.

More specifically, according to the present exemplary embodiment, the imaging apparatus 100 acquires an imaging condition (first imaging condition) at the point A and an imaging condition (second imaging condition) at the point B, calculates a trace cam curve based on the acquired imaging conditions, and performs lens operations along the calculated trace cam curve. The imaging conditions here are set with imaging parameters including the zoom magnification and the focus position. The imaging parameters may include a panning angle and a tilting angle for changing an imaging direction.

In the case of the trace cam curve indicated by the broken line in FIG. 6, the subject distance at which focus is achieved is gradually moved in one direction from 10 m to 1 m, specifically, 10 m→5 m→1 m→1 m→1 m.

A case where the imaging apparatus 100 operates as an imaging control apparatus that drives and controls the zoom lens and the focus lens to gradually move the focus in one direction during zooming according to the present exemplary embodiment will be described below. Alternatively, other devices different from the imaging apparatus 100 may operate as the above-described imaging control apparatus.

FIG. 7 is a diagram illustrating a method for calculating the trace cam curve indicated by the broken line in FIG. 6. A curve indicated by a broken line in FIG. 7 corresponds to the trace cam curve indicated by the broken line in FIG. 6.

The imaging apparatus 100 stores cam curves indicated by solid lines in FIG. 7 in advance, more specifically, cam curves representing relationships between positions of the zoom lens and the focus lens that are set to maintain the in-focus state for each subject distance. The imaging apparatus 100 acquires the imaging conditions for the points A and B and calculates the trace cam curve indicated by the broken line, based on amounts of change in zoom magnification and focus position from the point A to the point B and the stored cam curves.

At this time, the imaging apparatus 100 checks a positional relationship of the current lens position, more specifically, between which cam curves the current lens position is located. Furthermore, the imaging apparatus 100 calculates a position of the current lens position between the cam curves.

Figure 8:
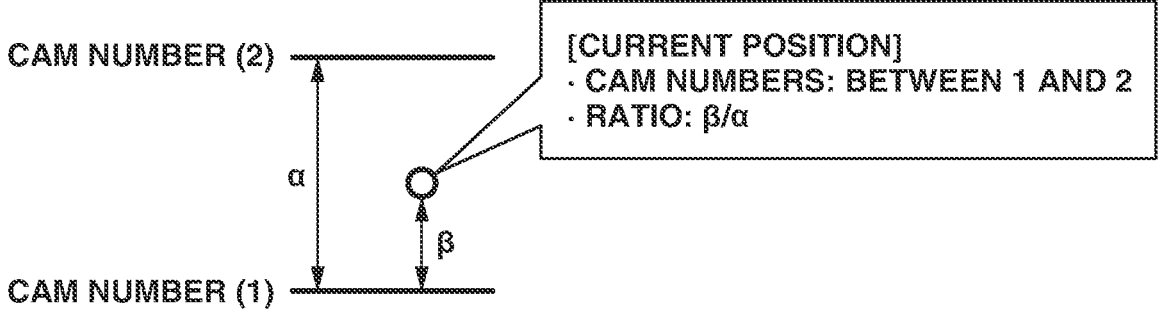
FIG. 8 is a diagram illustrating a focus position calculation method.

For example, in a case where a current position is at a position indicated in FIG. 8, the current position is calculated as being at a position of a ratio of β/α between cam curves (1) and (2), where a is an amount of movement of the focus lens between the cams, and β is an amount of movement of the focus lens from a reference cam (cam curve (1) in the case illustrated in FIG. 8).

The imaging apparatus 100 calculates positions at which the focus lens is to be located so as to gradually change the ratio β/α of the focus lens position as the zoom lens position is changed, and performs lens operations. At this time, in a case where the ratio of the lens position becomes α/α or 0/α, the reference cam is updated to a next cam, and the ratio calculation described above is repeated, while the lens operations are performed.

Balloons at imaging points in FIG. 7 schematically illustrate a movement in a case where a lens position is calculated with the above-described calculation method.

In the example illustrated in FIG. 7, the point A at which a ratio between cam curves (3) and (4) is 5/100 serves as an imaging start position, and the point B at which a ratio between cam curves (4) and (5) is 50/100 serves as an imaging end position. In this case, the lens position moves from between the cam curves (3) and (4) to between the cam curves (4) and (5) and does not pass, for example, between cam curves (1) and (2) and between cam curves (2) and (3), unlike the direct driving illustrated in FIG. 4. As described above, since the ratio of the lens position gradually changes in one direction (direction of increase in the case illustrated in FIG. 7), the focus gradually moves in a specific distance direction (close direction in the case illustrated in FIG. 7).

The imaging start and the imaging end may include a lens drive start and a lens drive end of the trace function.

Figure 9:
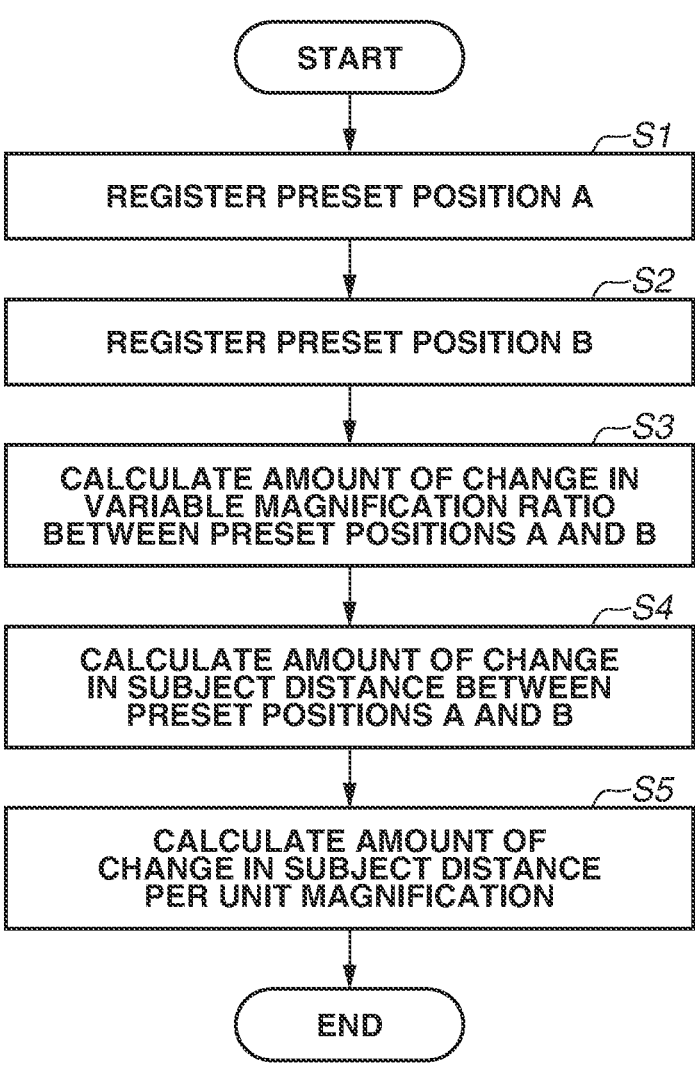
FIG. 9 is a flowchart illustrating operations according to the first exemplary embodiment.

FIG. 9 is a flowchart illustrating operations according to the present exemplary embodiment.

The CPU 11 of the imaging apparatus 100 in FIG. 2 realizes processing illustrated in FIG. 9 by reading a necessary program and executing the read program.

A shot function of movement between two points will be described below as an example.

Initially in step S1, the imaging apparatus 100 registers information about a preset position A, which is a movement start position. Next in step S2, the imaging apparatus 100 registers information about a preset position B, which is a movement end position.

The preset positions A and B can be designated by a user. The imaging apparatus 100 receives designation of the preset positions A and B from the user, acquires the information about each of the preset positions A and B, and stores the acquired information. The information to be stored at this time can be the focus lens position and the zoom lens position. Preset position designation methods are not particularly limited. For example, the user may designate a preset position by directly designating a focus position (subject position) and a zoom magnification. The user may adjust an angle of view and a focus through operation on a main body of the imaging apparatus 100 and press the set button or the like to designate a preset position.

In step S3, the imaging apparatus 100 calculates an amount of change in variable magnification ratio between the preset positions A and B stored in steps S1 and S2. The amount of change in variable magnification ratio is calculated based on the zoom lens positions at the preset positions A and B.

In step S4, the imaging apparatus 100 calculates an amount of change in subject distance between the preset positions A and B stored in steps S1 and S2. The amount of change in subject distance is information indicating changes from which cam curve to which cam curve between the preset positions A and B and to which ratio position (β/α) between the cam curves the position changes.

In step S5, the imaging apparatus 100 calculates an amount of change in subject distance per unit magnification, based on the amount of change in variable magnification ratio calculated in step S3 and the amount of change in subject distance calculated in step S4. At this time, the imaging apparatus 100 calculates the amount of change in subject distance per unit magnification so that the focusing operation ends simultaneously with the zooming operation. For example, an amount of change (rate of change) of a function can be adjusted based on another function that takes time to change.

Driving and controlling the focus lens based on the amount of change in subject distance per unit magnification that is calculated in step S5 enables the imaging apparatus 100 to perform lens operations of changing the focus position in one direction during zooming. More specifically, the imaging apparatus 100 calculates a position at which the focus lens is to be located based on a variable magnification amount from the preset position A, and performs lens operations. This realizes lens operations so that an amount of change in focus position per unit zoom magnification becomes constant. The imaging apparatus 100 is also capable of registering the lens operations in a memory so that the registered lens operations can be called. This makes it possible to perform the same lens operations repeatedly.

While a case where the amount of change in subject distance per unit magnification is calculated has been described above, this is not a limiting case. It is sufficient that the imaging apparatus 100 controls the rate of change in zoom magnification and the rate of change in focus position based on the information about each preset position, and the imaging apparatus 100 may calculate an amount of change in each imaging condition per unit time.

The imaging apparatus 100 may control the rate of change in zoom magnification and the rate of change in focus position based on a target rate designated by the user. Furthermore, the imaging apparatus 100 may control the rate of change in focus position based on, for example, a level of depth of field. Furthermore, the imaging apparatus 100 may control the rate of change in zoom magnification based on a change in angle of view caused by movement of the zoom lens.

Performing the registration and calculation operations described above realizes the shot function between the preset positions A and B. While the operations of the two functions of zoom and focus are described above, a similar operation is applied to a case of performing functions, such as pan and tilt, together.

As described above, the imaging apparatus 100 according to the present exemplary embodiment acquires the imaging conditions for the points A and B. The imaging conditions are set with imaging parameters including the zoom magnification and the focus position. The imaging apparatus 100 drives and controls the zoom lens and performs a zooming operation from the zoom magnification at the point A to the zoom magnification at the point B. The imaging apparatus 100 drives and controls the focus lens during the zooming operation, based on correspondence information indicating the focus lens position with respect to the zoom lens position for changing from the focus position at the point A to the focus position at the point B in one direction.

This makes it possible to view the focus gradually moving in a fixed distance direction while zooming. Realization of a focusing operation while maintaining a change in focal length in one direction as described above realizes natural bokeh. Since the above-described lens operations are realized based on the imaging conditions for the two points A and B, imaging that is intended by the user is realized more simply.

Here, the imaging apparatus 100 is capable of storing in advance cam curves representing relationships between positions of the zoom lens and the focus lens that are set to maintain the in-focus state for each subject distance, such as the cam curves indicated by the solid lines in FIG. 6. In this case, the imaging apparatus 100 can calculate a trace cam curve such as the trace cam curve indicated by the broken line in FIG. 6, based on amounts of change in zoom magnification and focus position from the point A to the point B and the cam curve. The imaging apparatus 100 performs lens operations along the calculated trace cam curve to suitably realize a movement of gradual-focusing while zooming from the point A to the point B.

According to the present exemplary embodiment, the focus lens position is moved along the trace cam curve indicated by the broken line in FIG. 6 to realize natural bokeh. The control of the focus lens position along the trace cam curve indicated by a broken line in FIG. 5 has been described to not realize imaging that is intended by the user capturing images.

However, in a case where the imaging apparatus 100 is used as a monitoring camera, quick focusing is sometimes demanded. In such a case, it is desirable to use the trace cam curve indicated by the broken line in FIG. 5, specifically, a trace cam curve (correspondence information) with the focus set at target subject distances.

Thus, as illustrated in FIG. 5, the focus position is moved onto the trace cam curve before the start of the zooming operation, and during the zooming operation, the focus position is controlled along the trace cam curve. In other words, the second drive unit is controlled to move the focus position to the focus position of the second imaging condition before the start of the zooming operation. The second drive unit is then controlled so as to move the focus position based on the correspondence information during the zooming operation.

This makes it possible to focus on the target subject before the start of the zooming operation and to maintain the state where the target subject is in-focus during the zooming operation (such a state is referred to as in-focus state).

Here, the trace cam curve (correspondence information) to be used is a trace cam curve that corresponds to a target subject distance. In a case where the plurality of stored cam curves includes a cam curve that corresponds to the target subject distance, the corresponding cam curve is used as the trace cam curve. In a case where there is no cam curve corresponding to the target subject distance, a cam curve with a subject distance closest to the target subject distance is used as a trace cam curve. Desirably, a trace cam curve is calculated based on the plurality of stored cam curves and the target subject distance. More specifically, a trace cam curve is calculated by interpolating two cam curves sandwiching the target subject distance among the plurality of stored cam curves. For example, in the case of FIG. 5, since the target subject distance (point B) is between 1 m and 5 m, a trace cam curve is calculated by interpolating the cam curves that correspond to 1 m and 5 m.

Next, a second exemplary embodiment of the present invention will be described below.

A description will be provided of a case where limits are placed on a movable range for the focus lens to appropriately realize operations of changing the focus position in one direction during zooming from the point A to the point B in AF operations according to the second exemplary embodiment. Since basic operations are similar to those according to the first exemplary embodiment described above, mainly differences from the first exemplary embodiment will be described below.

A general camera has a set movable range for the focus lens to achieve focusing from close distances to infinity. For example, in an example illustrated in FIG. 10, a range of cam curves (1) to (5) is set to a width within which the focus lens is movable.

With the foregoing setting to focus on a subject, reflected objects are focused one after another, and the movement of gradually adjusting the focus from the point A to the point B is not achieved.

Figure 11:
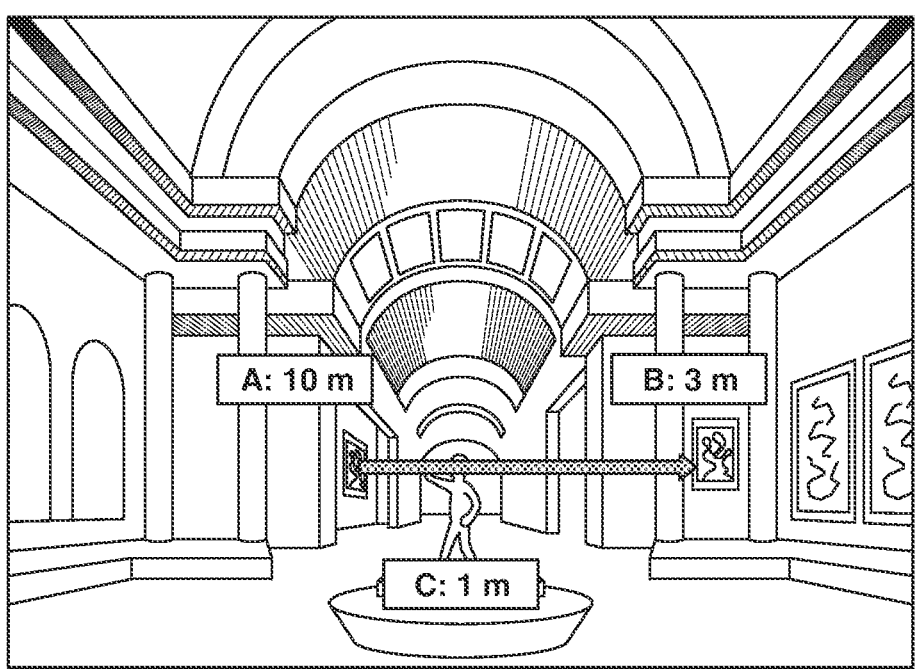
FIG. 11 is a diagram illustrating the setting of the focus movable range.

A case of adjusting the focus from a point A to a point B illustrated in FIG. 11 will be described below as an example. The illustration also includes panning operations. In a case where a subject at a distance of 1 m is reflected at a point C between the points A and B, although a gradual focus movement of 10 m→3 m from the point A to the point B is intended, a focus operation of 10 m→1 m→3 m is performed.

Thus, according to the present exemplary embodiment, the movable range for the focus lens is set to realize a gradual change to a target focus position.

Figure 12:
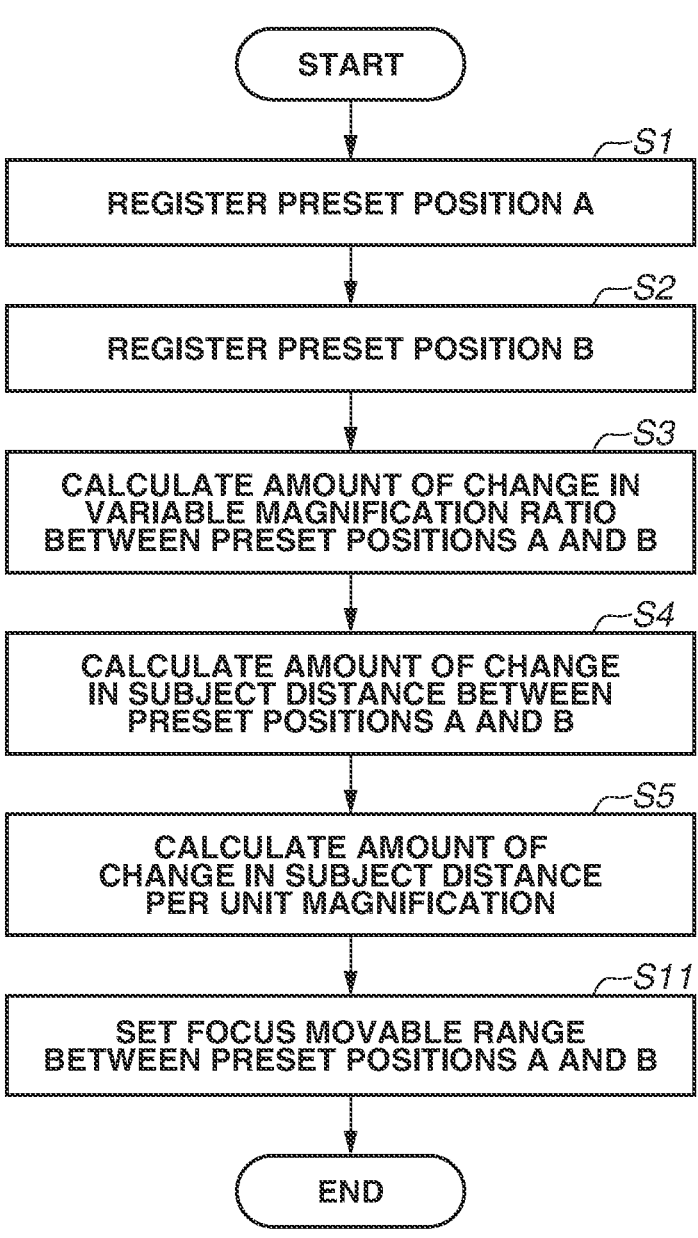
FIG. 12 is a flowchart illustrating operations according to a second exemplary embodiment.

FIG. 12 is a flowchart illustrating operations according to the present exemplary embodiment.

In FIG. 12, each step of performing processing corresponding to processing in FIG. 9 is assigned the same step number as the corresponding step, and mainly processing different from FIG. 9 will be described below.

In step S11, a focus movable range between the preset positions A and B is set as indicated by bolded solid lines in FIG. 10. The focus movable range is a movable range of the focus lens which is limited based on a trace cam curve indicated by a broken line in FIG. 10. The trace cam curve indicated by the broken line in FIG. 10 corresponds to the trace cam curve that is indicated by the broken line in FIG. 6 and calculated according to the first exemplary embodiment.

The focus movable range is gradually changed based on the target subject distance. As the limited range is narrowed, a movement closer to the targeted movement is realized, but more detailed settings are to be set. On the contrary, as the limited range is widened, imaging is realized to some extent with general settings of movement, but a movement that is not intended by the user capturing images may be performed. According to the present exemplary embodiment, the closer the target subject distance is, the wider the focus movable range is set.

The width of the focus movable range may be registered in advance in the imaging apparatus 100 or can be set by the user.

As described above, the AF operations perform focus control based on the AF evaluation value. Thus, by limiting (e.g., greatly lowering) the AF evaluation value of a predetermined subject distance range, limits can be placed on the focus in the subject distance range.

Thus moving the focus lens within the limited range of movement of the focus lens as described above enables the shot function between the preset positions A and B to be still appropriately realized in the AF operations.

Next, a third exemplary embodiment of the present invention will be described below.

The third exemplary embodiment enables the users to set movements of a plurality of imaging functions more easily and visually.

In the case of registering operations of movements of about two functions between two points as described above, a user may be able to remember an order of the operations and details of changes in the operations. However, in a case where there is a plurality of movement segments or a plurality of operation methods or in a case where settings are to be set again after some time has passed, it is often significantly difficult for a user to remember details of the operations.

Thus, the imaging apparatus 100 according to the present exemplary embodiment performs display control to display, on a monitor, a setting screen including axes with functions (e.g., imaging parameters) to be operated as components. This is intended to enable the users to set the imaging conditions while visually checking how each function moves in order.

Figure 13:
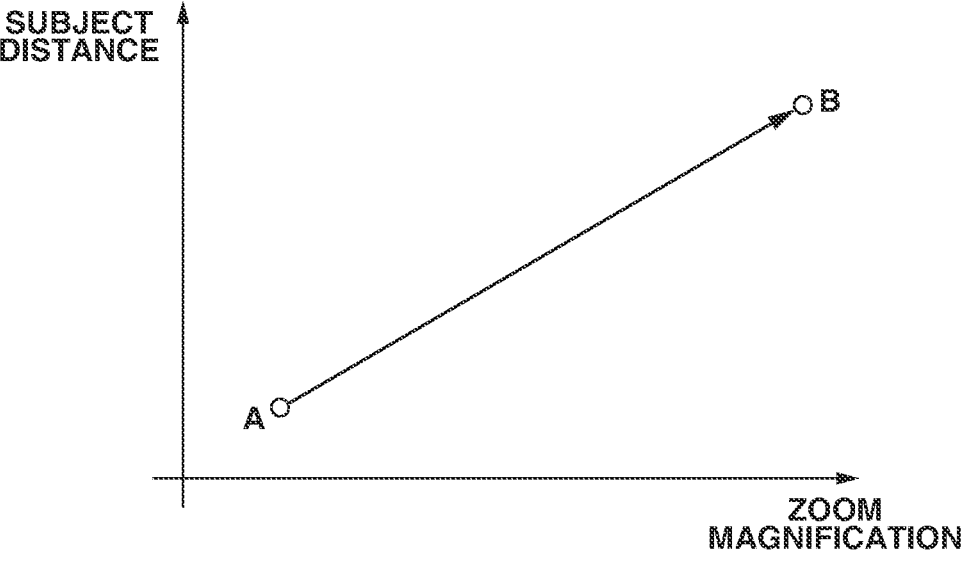
FIG. 13 illustrates an example of settings of registration information about a focus lens and a zoom lens.

FIG. 13 illustrates a setting screen for a case of performing the two functions of focus and zoom. A movement between two points, from a point A to a point B, will be described below as the simplest example.

In this case, as illustrated in FIG. 13, the imaging apparatus 100 displays a setting screen including axes with zoom magnification and subject distance (e.g., focus position) at which focus is achieved as components, and the user designates two points A and B on the displayed setting screen. A registration point is designated by, for example, clicking on the setting screen to select the clicked point. At this time, simply displaying a positional relationship between the two points A and B with circles as illustrated in FIG. 13 enables the user to grasp movements of each function intuitively.

Figure 14:
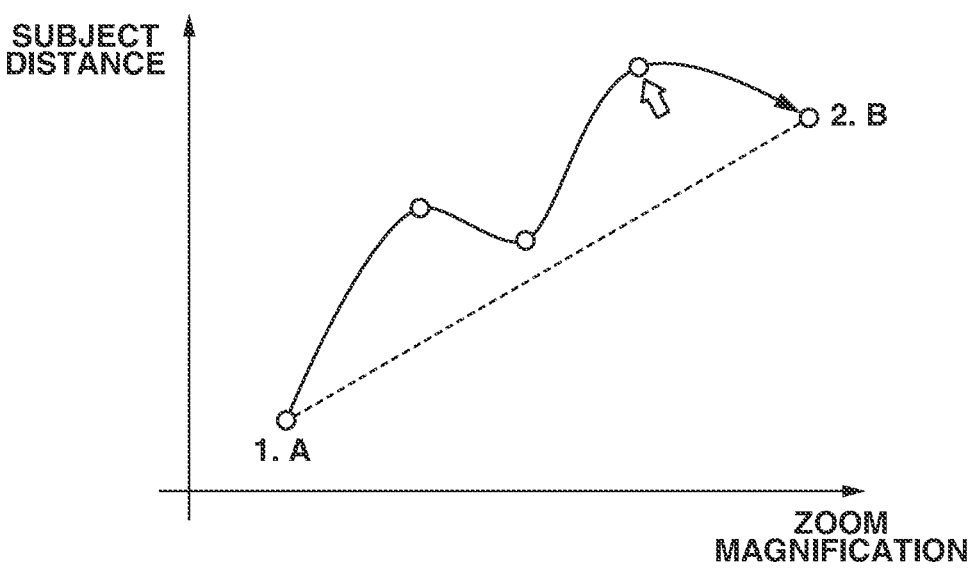
FIG. 14 illustrates an example of settings of registration information about the focus lens and the zoom lens.

In a case of setting two or more registration points, the plurality of registration points may be designated sequentially on the setting screen as illustrated in FIG. 14. In a case of setting a plurality of registration points between the registration points A and B, for example, a straight line indicated by a dotted line connecting the registration points A and B can be selected and pulled upward to set a solid curve as illustrated.

Furthermore, in order to make it possible to grasp a change process, symbols and numbers indicating an order of changes may be displayed, and arrows indicating movements between the registration points may be displayed. This enables the user to grasp the movements of the functions intuitively.

Figure 15:
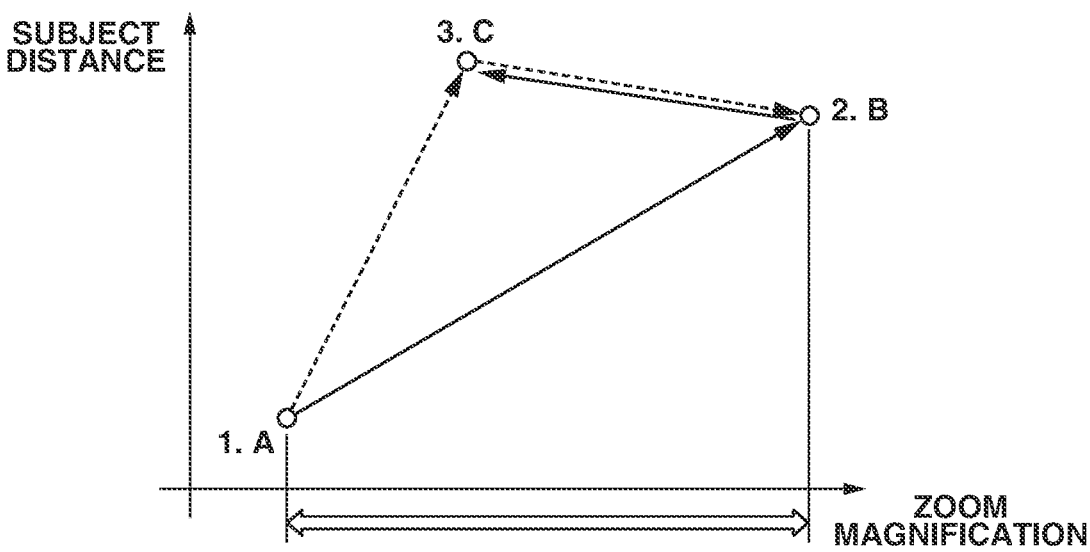
FIG. 15 illustrates an example of operations in registering a plurality of points.

In a case where a point C is set after points A and B are set as illustrated in FIG. 15 in setting two or more registration points, an option to select either a movement of A→B→C in the order of registration as indicated by solid arrows or a movement of A→C→B as indicated by dotted arrows can be provided.

In the case of the movement of A→C→B, the rate of change from the point A to the point C and the rate of change from the point C to the point B can be automatically set to realize the movement of A→C→B while the movement time from the point A to the point B is maintained. More specifically, the rates of change for the functions can be controlled based on a set time from an imaging start (e.g., start of movement) to an imaging end (e.g., end of movement). This makes it possible to perform imaging with the initially set time maintained, thus realizing imaging that is intended by the user.

Figure 16:
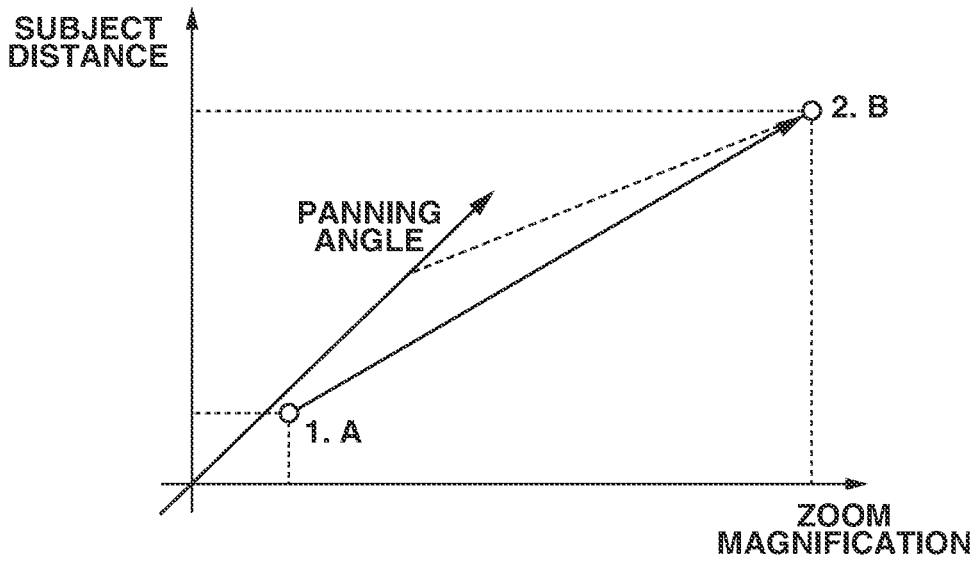
FIG. 16 illustrates an example of a display in registering a plurality of functions.

Furthermore, in a case of performing not only the two functions of focus and zoom but also, for example, the panning function of changing the imaging direction, a component axis can be added as illustrated in FIG. 16. This visualizes a correspondence relationship at each point.

However, the addition of a component axis increases complexity, so that a setting screen including axes fewer than the total number of imaging parameters may be displayed. In this case, the components of the axes of the setting screen can be configured to be switchable.

Figure 17A:
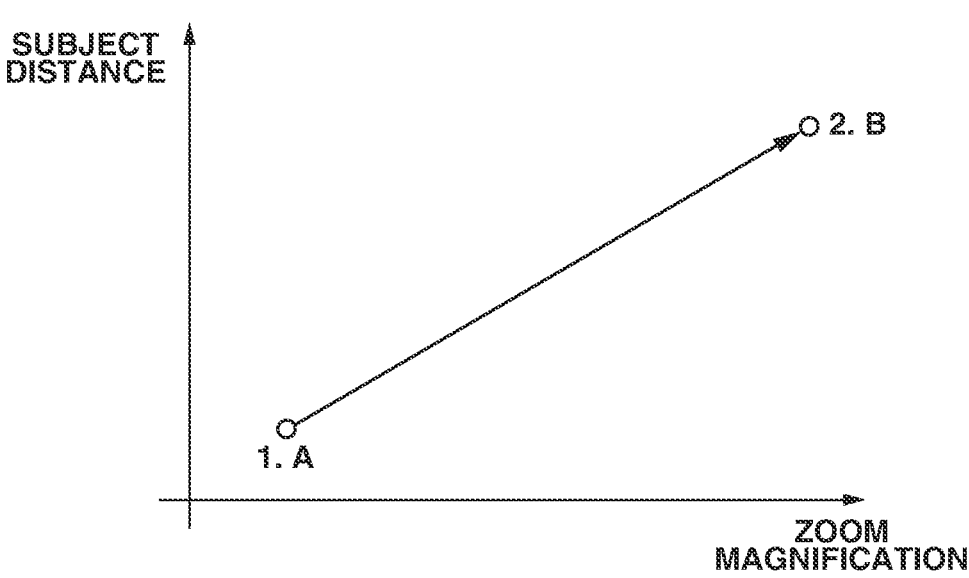
FIGS. 17A and 17B illustrate an example of switching component axes in registering a plurality of functions.
Figure 17B:
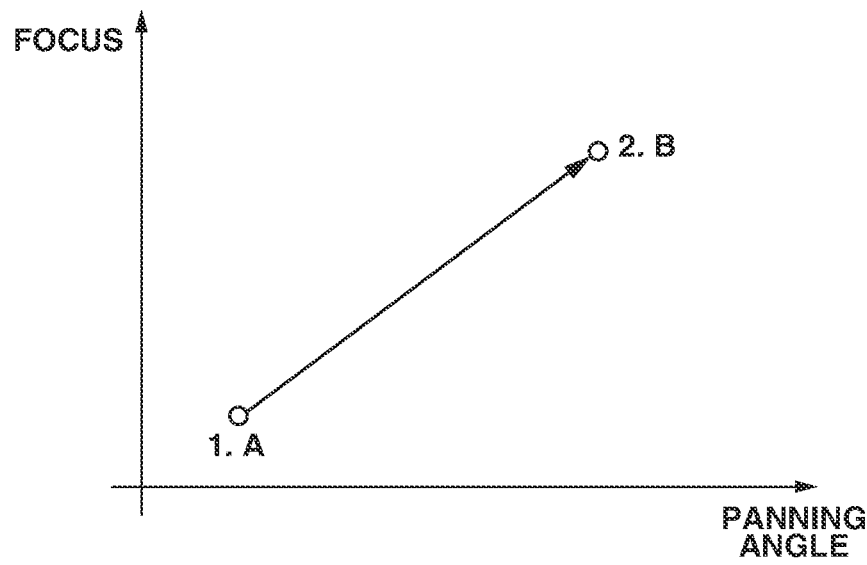

FIGS. 17A and 17B illustrate FIG. 16 redrawn with two axes. A setting screen illustrated in FIG. 17A includes subject distance and zoom magnification as components of the axes, whereas a setting screen illustrated in FIG. 17B includes subject distance and panning angle as components of the axes.

Thus displaying a multi-axis setting screen with a reduced number of axes as described above enables the user to easily recognize a correspondence relationship at each point.

As described above, the imaging apparatus 100 according to the present exemplary embodiment performs display control to display a setting screen including axes with imaging parameters as components and acquires the first and second imaging conditions that are designated on the setting screen by the user. At this time, the imaging apparatus 100 can also acquire information indicating the change process from the first imaging condition to the second imaging condition.

Here, in the case of, for example, the movement of A→B→C indicated by the solid arrows in FIG. 15, the points A and B respectively correspond to the first imaging condition and the second imaging condition for the movement between the points A and B. The points B and C respectively correspond to the first imaging condition and the second imaging condition for the movement between the points B and C.

The foregoing configurations enable the imaging apparatus 100 to appropriately realize imaging that is intended by the user. Movements between registration points are schematically represented to be set, thus enabling the user to intuitively set complicated settings more easily.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-178645, filed Nov. 8, 2022, which is hereby incorporated by reference herein in its entirety.

What is claimed is:

1. An apparatus comprising:
a first drive unit configured to drive a zoom lens and change an angle of view;
a second drive unit configured to drive a focus lens and change a focus position;
at least one processor; and
a memory coupled to the at least one processor, the memory storing instructions that, when executed by the at least one processor, cause the at least one processor to:
acquire a first imaging condition and a second imaging condition, wherein an imaging parameter is set for each of the first and second imaging conditions, the imaging parameter includes a zoom magnification and a focus position;
control the first drive unit to perform a zooming operation from the zoom magnification of the first imaging condition to the zoom magnification of the second imaging condition;
store a cam curve indicating a relationship between a zoom lens position and a focus lens position that are set to maintain an in-focus state based on a subject distance;
calculate correspondence information based on an amount of change from the zoom magnification of the first imaging condition to the zoom magnification of the second imaging condition, an amount of change from the focus position of the first imaging condition to the focus position of the second imaging condition, and the cam curve;

control the second drive unit during the zooming operation based on the correspondence information indicating the focus lens position with respect to the zoom lens position, to change from the focus position of the first imaging condition to the focus position of the second imaging condition in one direction; and
display a setting screen including an axis with the imaging parameter as a component,
wherein the first imaging condition and the second imaging condition that are designated on the setting screen and information indicating a change process from the first imaging condition designated on the setting screen to the second imaging condition designated on the setting screen are acquired,
wherein the second drive unit is controlled based on a current position of the focus lens in the correspondence information calculated from an amount of movement of the focus lens between cams and an amount of movement of the focus lens from a reference cam, and
wherein the reference cam is updated in a case where the amount of movement of the focus lens from the reference cam becomes equal to the amount of movement of the focus lens between cams or 0.

2. The apparatus according to claim 1, wherein the instructions cause the at least one processor to move the focus lens within a movable range of the focus lens on which a limit is placed based on the calculated correspondence information.

3. The apparatus according to claim 1, wherein the instructions cause the at least one processor to control a rate of change in the zoom magnification and a rate of change in the focus position, based on the first imaging condition and the second imaging condition.

4. The apparatus according to claim 3, wherein the instructions cause the at least one processor to control the second drive unit so that an amount of change in the focus position per unit zoom magnification is constant.

5. The apparatus according to claim 3, wherein the instructions cause the at least one processor to control the second drive unit to end a focusing operation simultaneously with the zooming operation.

6. The apparatus according to claim 3, wherein the instructions cause the at least one processor to:
acquire the first imaging condition and the second imaging condition that are set from an imaging start to an imaging end; and
control the first drive unit and the second drive unit based on a set time from the imaging start to the imaging end.

7. The apparatus according to claim 1, wherein the instructions cause the at least one processor to display, in a case where the imaging parameter is plural, the setting screen including axes that are fewer in number than a total number of the imaging parameters.

8. The apparatus according to claim 1, wherein components of the axes on the setting screen are configured to be switched.

9. The apparatus according to claim 1, wherein the instructions cause the at least one processor to display, on the setting screen, information from which the change process from the first imaging condition to the second imaging condition is graspable.

10. The apparatus according to claim 1, wherein the information from which the change process is graspable includes at least one of an arrow and a symbol indicating an order of changing an imaging condition.

11. The apparatus according to claim 1, wherein the instructions further cause the at least one processor to register a zooming operation to be performed by a first control unit and a focusing operation to be performed by a second control unit.

12. The apparatus according to claim 1, wherein the instructions cause the at least one processor to:

control the second drive unit to move the focus position to the focus position of the second imaging condition before the zooming operation is started; and control the second drive unit to move the focus position based on the correspondence information during the zooming operation.

13. A method comprising:

acquiring a first imaging condition and a second imaging condition, wherein an imaging parameter is set for each of the first and second imaging conditions, the imaging parameter includes a zoom magnification and a focus position;

driving and controlling a zoom lens to perform a zooming operation from the zoom magnification of the first imaging condition to the zoom magnification of the second imaging condition;

storing a cam curve indicating a relationship between a zoom lens position and a focus lens position that are set to maintain an in-focus state based on a subject distance;

calculating correspondence information based on an amount of change from the zoom magnification of the first imaging condition to the zoom magnification of the second imaging condition, an amount of change from the focus position of the first imaging condition to the focus position of the second imaging condition, and the cam curve;

driving and controlling a focus lens during the zooming operation based on the correspondence information indicating the focus lens position with respect to the zoom lens position, to change from the focus position of the first imaging condition to the focus position of the second imaging condition in one direction; and displaying a setting screen including an axis with the imaging parameter as a component, wherein the first imaging condition and the second imaging condition that are designated on the setting screen and information indicating a change process from the first imaging condition designated on the setting screen to the second imaging condition designated on the setting screen are acquired, wherein the focus lens is controlled based on a current position of the focus lens in the correspondence information calculated from an amount of movement of the focus lens between cams and an amount of movement of the focus lens from a reference cam, and wherein the reference cam is updated in a case where the amount of movement of the focus lens from the reference cam becomes equal to the amount of movement of the focus lens between cams or 0.

14. A non-transitory computer-readable storage medium storing a program for causing a computer to execute a method comprising:

acquiring a first imaging condition and a second imaging condition, wherein an imaging parameter is set for each of the first and second imaging conditions, the imaging parameter includes a zoom magnification and a focus position;

driving and controlling a zoom lens to perform a zooming operation from the zoom magnification of the first imaging condition to the zoom magnification of the second imaging condition;

storing a cam curve indicating a relationship between a zoom lens position and a focus lens position that are set to maintain an in-focus state based on a subject distance;

calculating correspondence information based on an amount of change from the zoom magnification of the first imaging condition to the zoom magnification of the second imaging condition, an amount of change from the focus position of the first imaging condition to the focus position of the second imaging condition, and the cam curve;

driving and controlling a focus lens during the zooming operation based on the correspondence information indicating the focus lens position with respect to the zoom lens position, to change from the focus position of the first imaging condition to the focus position of the second imaging condition in one direction; and displaying a setting screen including an axis with the imaging parameter as a component, wherein the first imaging condition and the second imaging condition that are designated on the setting screen and information indicating a change process from the first imaging condition designated on the setting screen to the second imaging condition designated on the setting screen are acquired, wherein the focus lens is controlled based on a current position of the focus lens in the correspondence information calculated from an amount of movement of the focus lens between cams and an amount of movement of the focus lens from a reference cam, and wherein the reference cam is updated in a case where the amount of movement of the focus lens from the reference cam becomes equal to the amount of movement of the focus lens between cams or 0.

* * * * *